United States Patent
Hines et al.

(10) Patent No.: US 10,023,243 B2
(45) Date of Patent: Jul. 17, 2018

(54) SHUTTLE/TRANSIT BUS WITH LOW FLOOR

(71) Applicant: ARBOC Specialty Vehicles, LLC, Middlebury, IN (US)

(72) Inventors: Barry Roy Hines, Goshen, IN (US); Kelvin Tetzloff, White Pigeon, MI (US); Donald Wayne Roberts, Franklin, NC (US)

(73) Assignee: ARBOC Specialty Vehicles LLC, Middlebury, IN (US)

( * ) Notice: Subject to any disclaimer, the term of this patent is extended or adjusted under 35 U.S.C. 154(b) by 0 days.

(21) Appl. No.: 15/014,238

(22) Filed: Feb. 3, 2016

(65) Prior Publication Data
US 2017/0216112 A1 Aug. 3, 2017

(51) Int. Cl.
| | |
|---|---|
| *A61G 3/06* | (2006.01) |
| *B62D 65/04* | (2006.01) |
| *B62D 25/20* | (2006.01) |
| *B62D 31/02* | (2006.01) |
| *B62D 21/02* | (2006.01) |
| *B62D 21/12* | (2006.01) |
| *B62D 27/06* | (2006.01) |
| *B62D 65/02* | (2006.01) |

(52) U.S. Cl.
CPC ............. *B62D 25/20* (2013.01); *B62D 21/02* (2013.01); *B62D 21/12* (2013.01); *B62D 27/065* (2013.01); *B62D 31/02* (2013.01); *B62D 65/02* (2013.01); *A61G 3/061* (2013.01)

(58) Field of Classification Search
CPC ........ A61G 3/061; B62D 31/02; B62D 25/20; B62D 65/04; B62D 21/02; B62D 21/12; B62D 65/02
USPC .......................................................... 296/178
See application file for complete search history.

(56) References Cited

U.S. PATENT DOCUMENTS

| | | | | |
|---|---|---|---|---|
| 5,577,793 | A * | 11/1996 | Kobasic ................ | B62D 31/02 296/146.12 |
| 6,702,057 | B1 | 3/2004 | Bartel | |
| 6,830,417 | B2 * | 12/2004 | Deets ................ | B62D 33/0612 410/4 |
| 7,232,004 | B2 | 6/2007 | Bartel | |
| 7,568,546 | B2 | 8/2009 | Bartel | |
| 7,802,801 | B2 | 9/2010 | Bartel et al. | |
| 8,371,589 | B2 * | 2/2013 | Bartel ................... | A61G 3/061 280/6.152 |
| 8,807,575 | B2 | 8/2014 | Bartel | |
| 2003/0010561 | A1 | 1/2003 | Bartel | |

* cited by examiner

*Primary Examiner* — Joseph D. Pape
*Assistant Examiner* — Dana D Ivey
(74) *Attorney, Agent, or Firm* — Matthew J. Marguardt; Dickinsons Wright PLLC

(57) ABSTRACT

A cutaway bus is provided with a monocoque body attached to an OEM cab frame having the chassis removed. The bus body includes a horizontal frame to which panels are attached to define a continuous, non-stepped floor for the passenger area of the bus. The floor resides at a lower level than the OEM cab frame. The bus entryway is sloped and includes a deployable ramp for wheelchair ingress and egress.

12 Claims, 13 Drawing Sheets

SHUTTLE/TRANSIT BUS WITH LOW FLOOR

BACKGROUND OF THE INVENTION

Light and medium duty shuttle buses and transit buses are uniquely useful, with the appropriate structural accommodations, for transporting people in wheelchairs and other physical handicaps. These specialty vehicles are much smaller than mass transit buses and have much different construction due to the difference in sizes and in applications. These specialty shuttle and transit buses typically have a gross vehicle weight rating of 10,000-20,000 pounds, as compared to a heavy duty big bus with a weight of 28,000-40,000 pounds. The conventional smaller shuttle and transit buses are typically built on an OEM chassis having a cab. These small specialty vehicles include an independent floor and body structure mounted on top of the chassis rails, thereby creating a higher floor level for bus users, or sloped floors which incline front to back so as to clear the rear wheel axle. However, sloped floors, even at 2°-4°, can create instability for passengers, whether walking through the bus or sitting in a wheelchair.

These types of buses are subject to many governmental regulations, guidelines, and restrictions. For example, these buses must meet certain qualifications for ease of entrance, passenger capacity, safe egress, interior maneuverability, minimal dimensions, step heights, and ramp heights and slopes, so as to provide appropriate accessibility for individuals with handicaps. See, among other things, 36 CFR Part 1192, APTA Procurement Guidelines, and Federal Register Part 571.

Thus, there is a need in the industry for a light to medium duty shuttle bus or transit bus which meets all of the federal and state requirements, and which overcomes the problems of the prior art.

Accordingly, a primary object of the present invention is the provision of an improved handicap accessible shuttle bus and transit bus which meets all governmental regulations and guidelines.

Another objective of the present invention is the provision of a specialty bus vehicle with improved handicap accessibility.

A further objective of the present invention is the provision of a light to medium duty shuttle bus or transit bus having a monocoque body structure mounted to an OEM cab, with the OEM chassis cut off.

Another objective of the present invention is the provision of a cut away bus built on an OEM cab having a cab frame, with the bus frame being connected to the cab frame so as to provide a low level, non-sloped, continuous floor from the front of the passenger compartment to the rear of the passenger compartment.

Still another objective of the present invention is the provision of a specialty bus vehicle mounted to an OEM cab having a floor residing at an elevation below the OEM cab frame.

Yet another objective of the present invention is the provision of a monocoque bus frame attached to an OEM cab frame with the bus frame stepped down from the cab frame.

Yet another objective of the present invention is the provision of a monocoque bus frame attached to an OEM cab frame with the bus frame stepped down from the cab frame.

Another objective of the present invention is the provision is light to medium duty specialty vehicle for handicapped passengers which is economical to manufacture, and durable and safe in use.

These and other objectives will become apparent from the following description of the invention.

SUMMARY OF THE INVENTION

The cutaway shuttle or transit bus of the present invention is built on an OEM cab wherein the chassis has been cut off. The bus includes a monocoque body structure with a frame plugged into the cab frame, with a stepped down floor which extends substantially horizontally to the rear of the bus without a step up over the rear bus axle. The bus includes a sloped entry into the passenger compartment, with an extendable and retractable ramp which can be deployed to the roadway or an adjacent sidewalk for ingress and egress by passengers, including those in wheelchairs. The combination OEM cab and monocoque bus body meets all governmental regulations and guidelines for light and medium duty buses, so as to have widespread application, particularly for handicap accessibility.

DETAILED DESCRIPTION OF THE PREFERRED EMBODIMENTS

Figure 1:
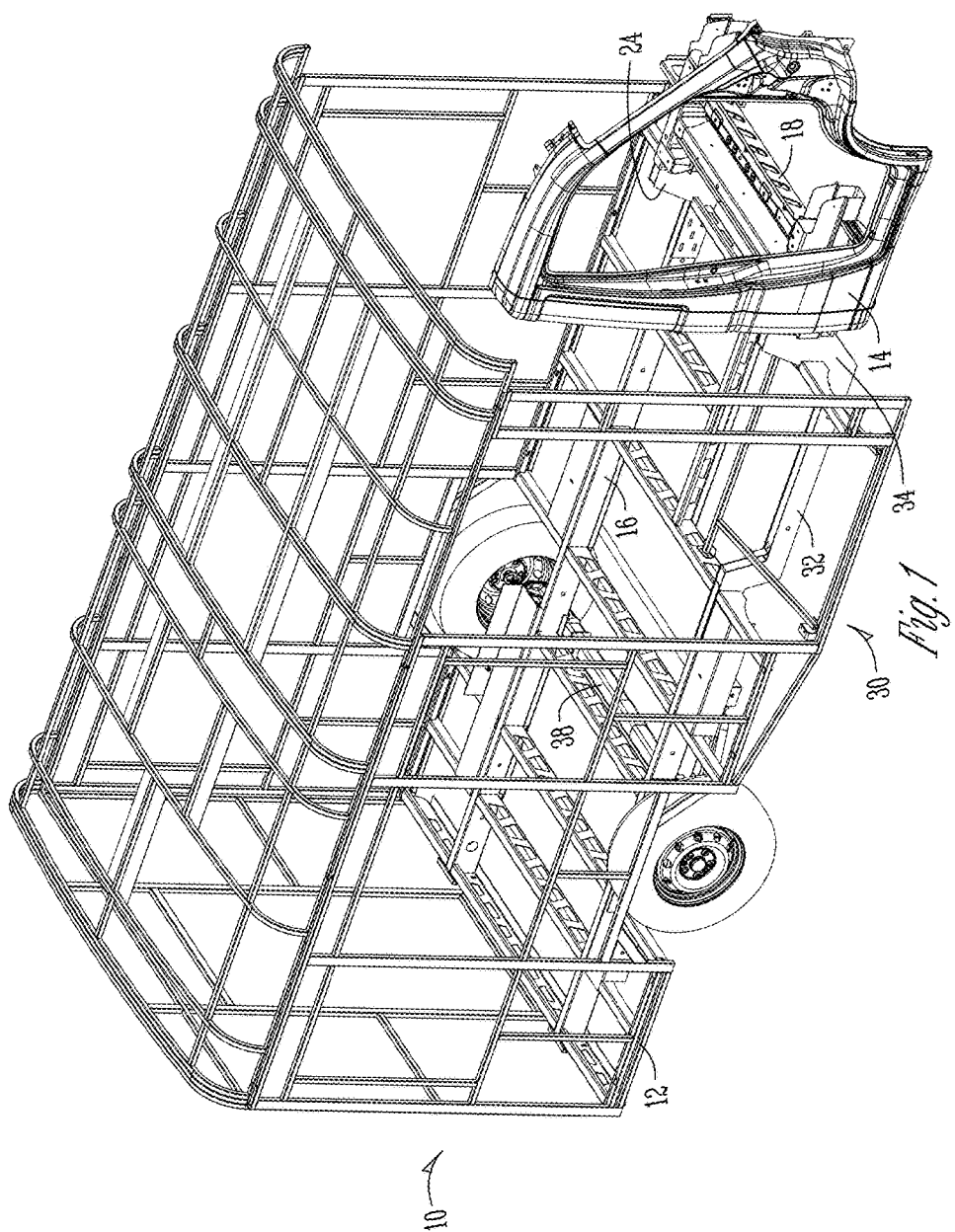
FIG. 1 is a perspective view of the bus body attached to an OEM cab for the shuttle bus or transit bus for the present invention.
Figure 2:
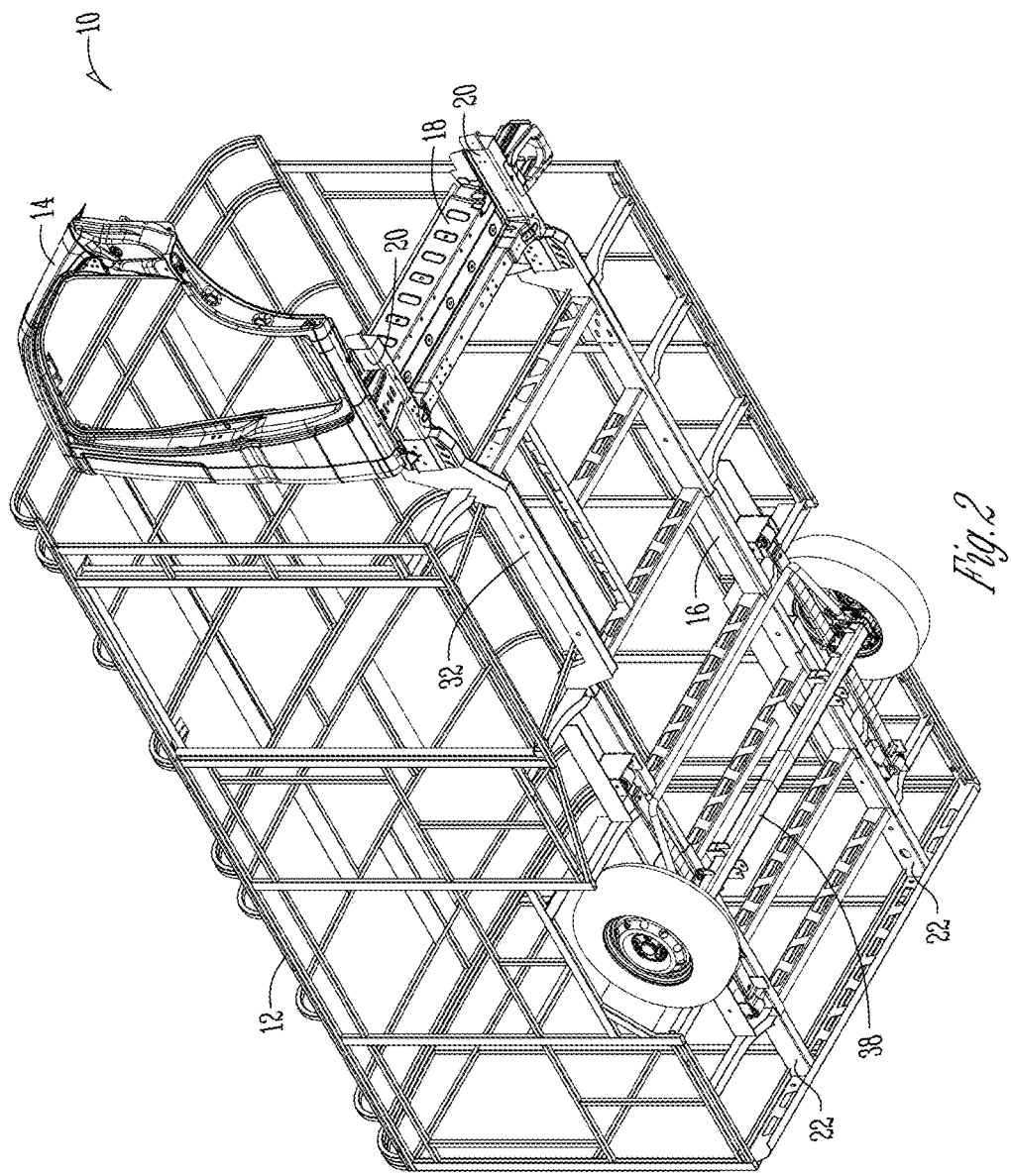
FIG. 2 is a bottom perspective view of the bus of the present invention.
Figure 3:
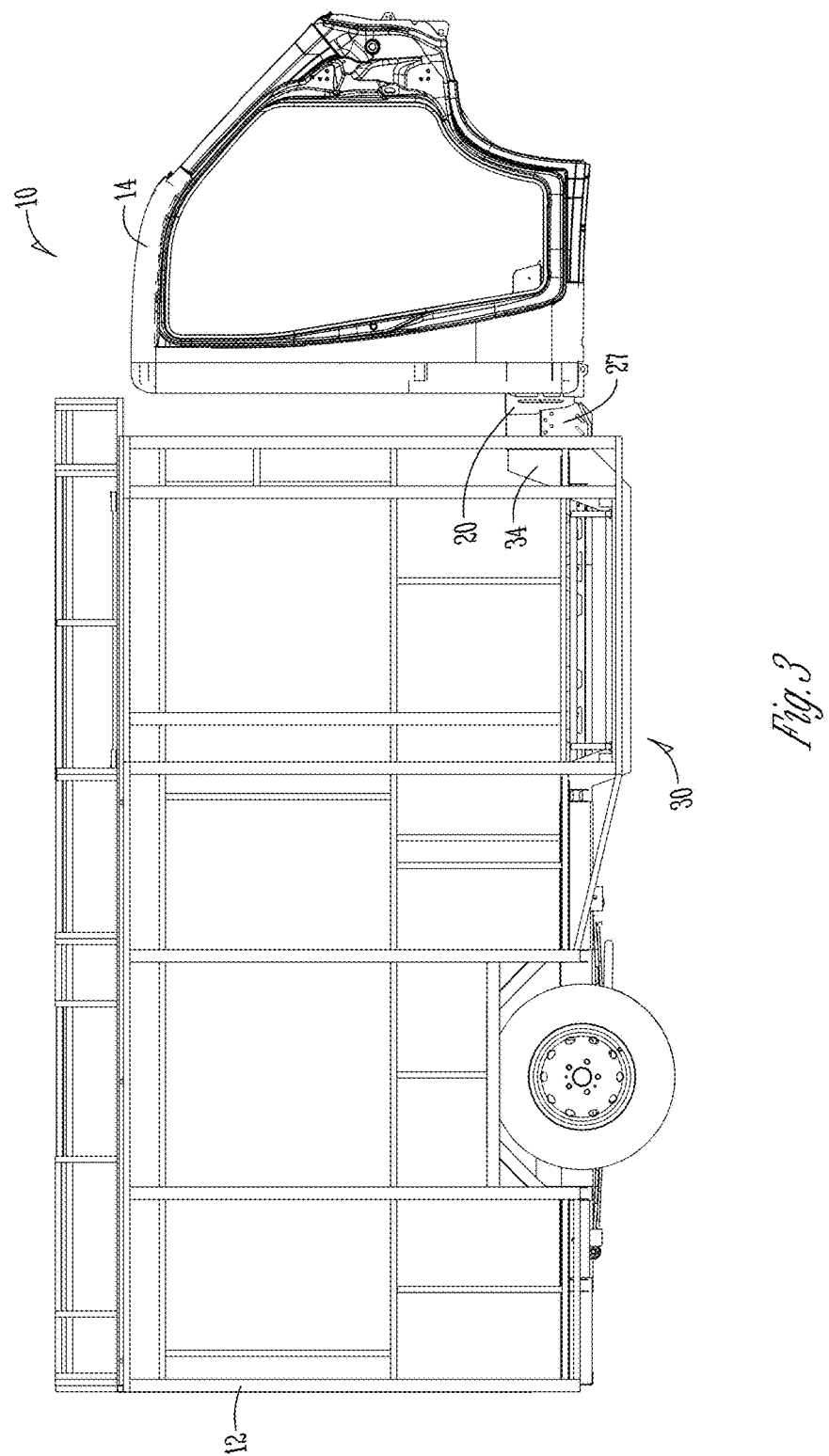
FIG. 3 is a side elevation view of the bus of the present invention.
Figure 4:
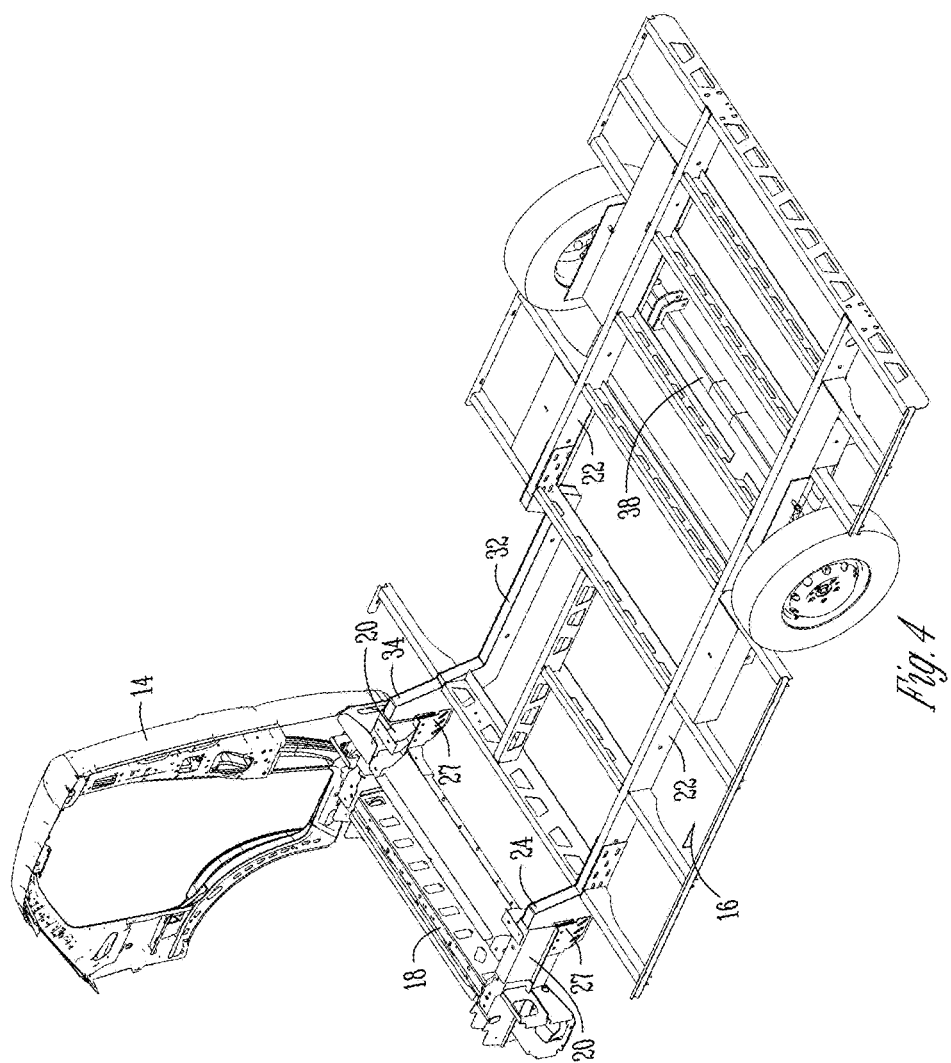
FIG. 4 is a perspective view showing the bus floor frame connected to the OEM cab frame.

The specialty vehicle bus of the present invention is generally designated by the reference number 10 in the drawings. The bus 10 is commonly referred to as a cutaway bus used for shuttle and transit purposes, and is not a heavy-duty mass transit bus. The bus 10 is light to medium duty, with a GVWR between 9,350 and 20,000 lbs, and a wheel base between 135-200 inches.

The bus 10 includes a unitary or monocoque body structure 12 which is mounted to an OEM cab 14. The chassis of the OEM cab 14 has been cutaway immediately behind the driver compartment 14. The body 12 includes a floor frame 16 which is attached to the cab frame 18, as shown in FIG. 4-8.

Figure 8:
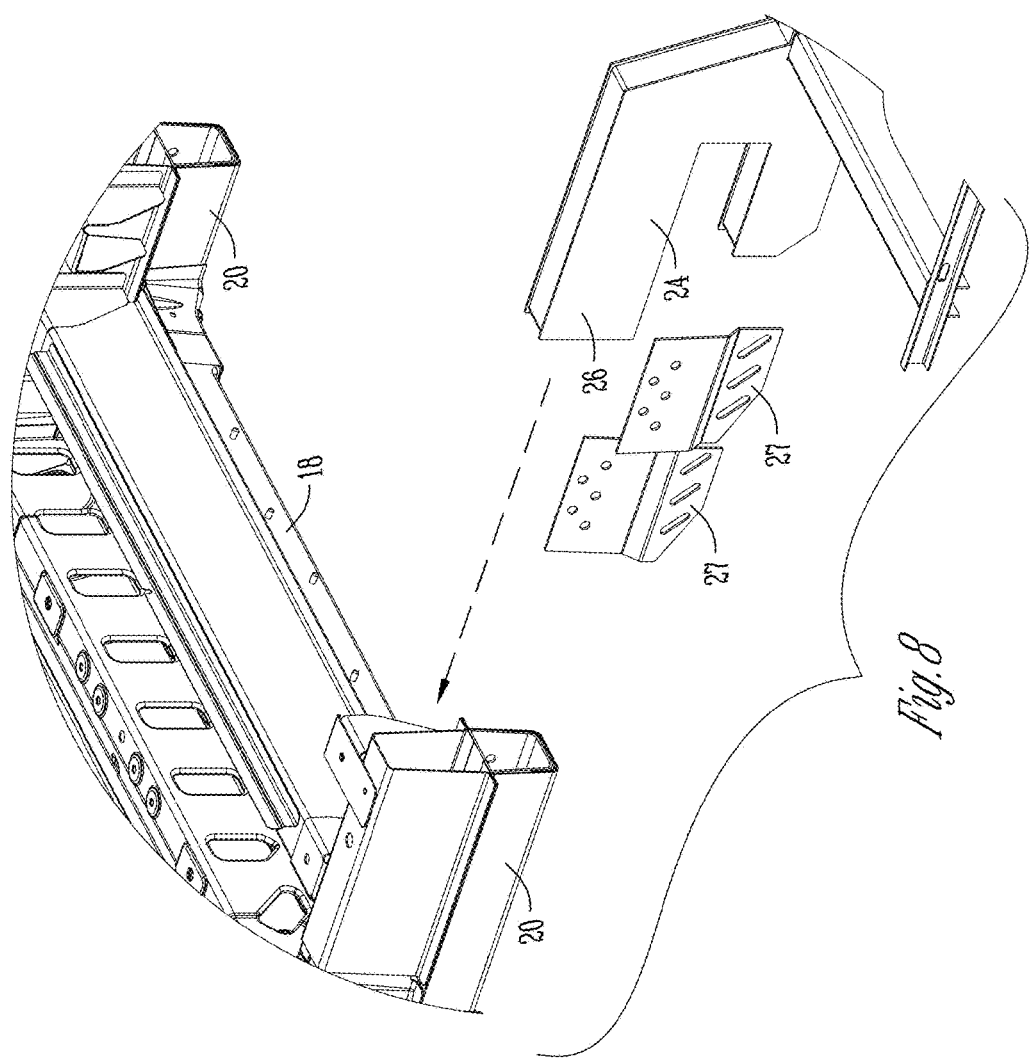
FIG. 8 is an exploded view of a plug-in connection for the bus frame to the cab frame.
Figure 9:
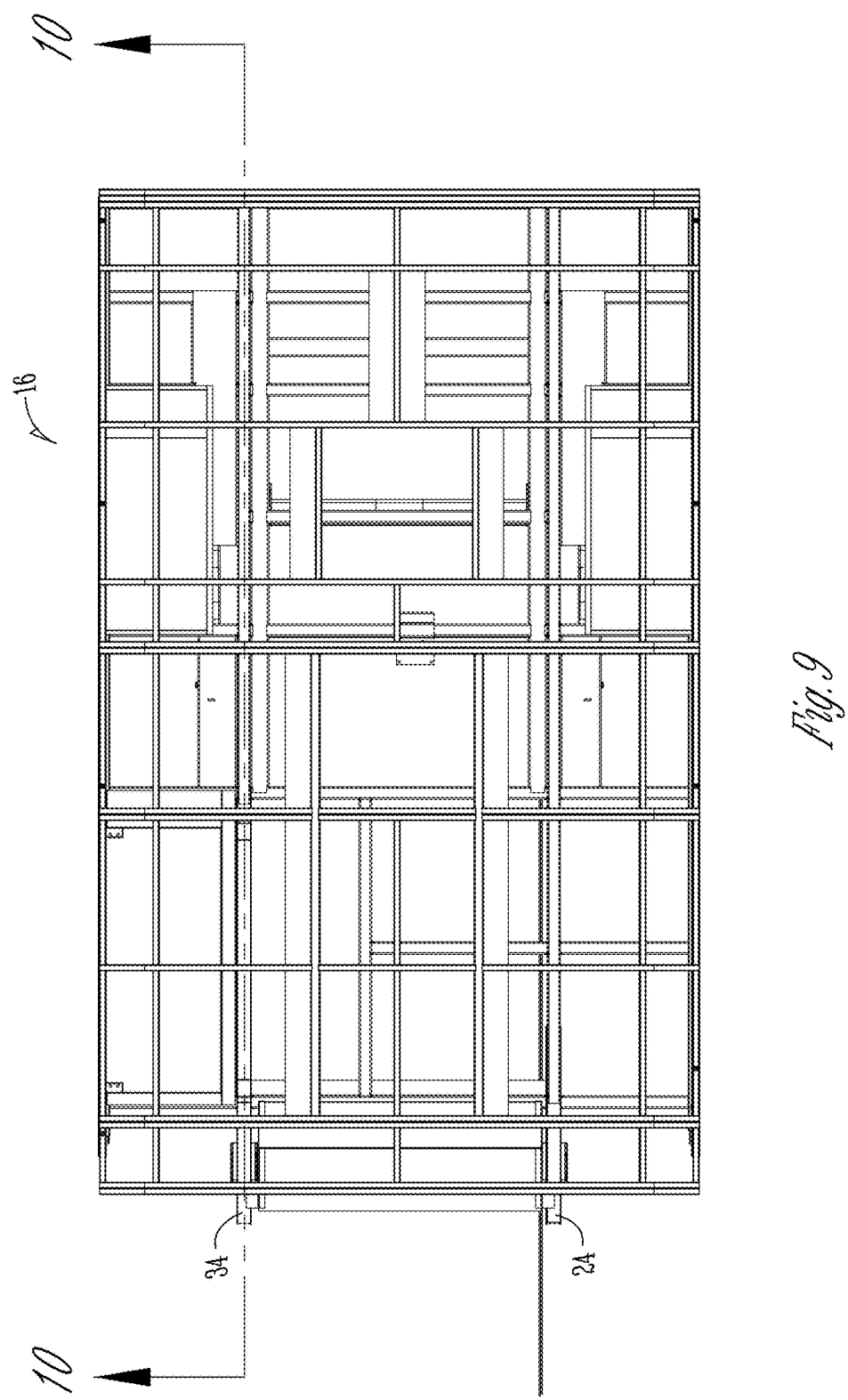
FIG. 9 is a top plan view of the bus body.
Figure 10:
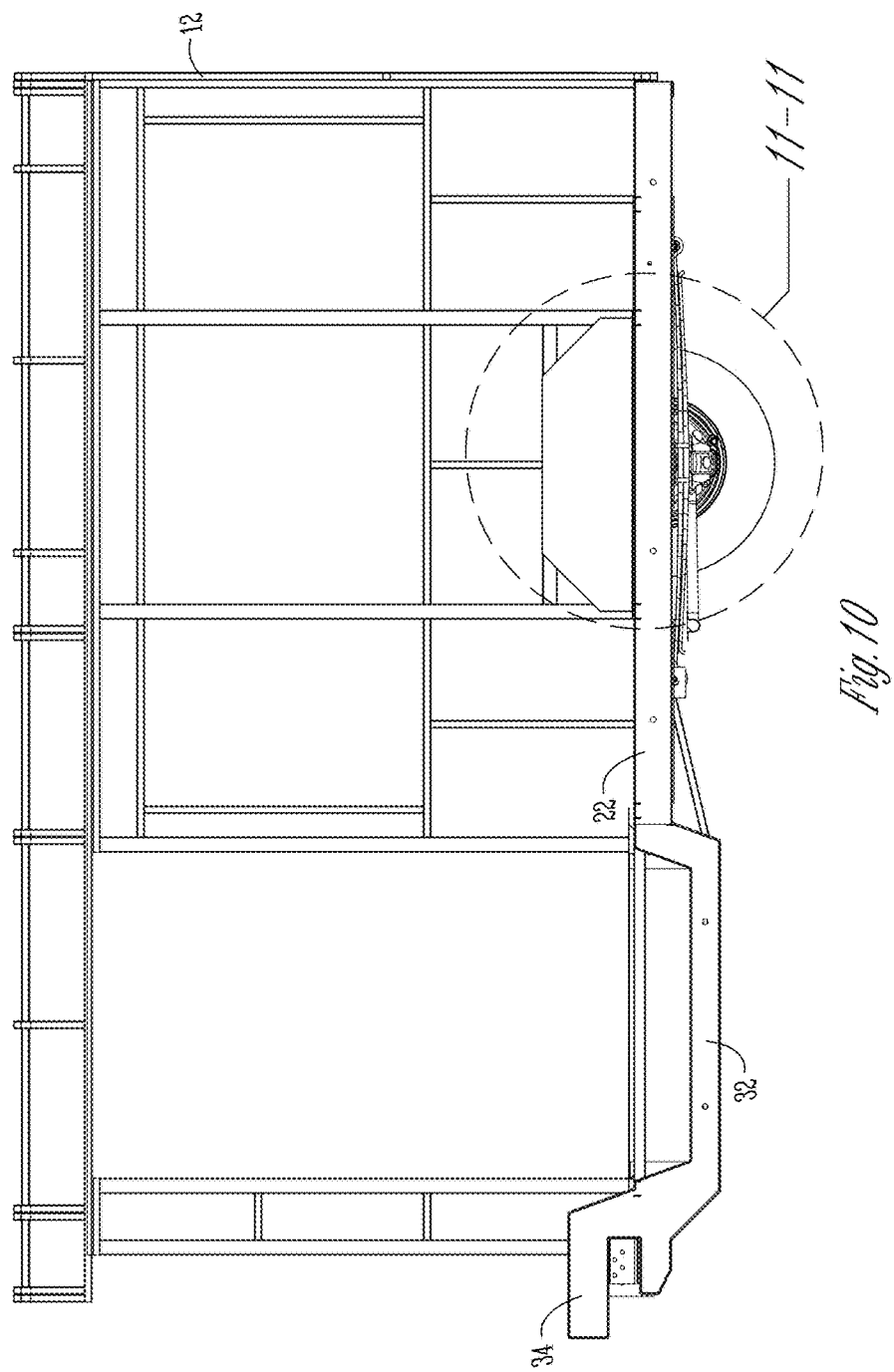
FIG. 10 is an elevation view taken along lines 10-10 of FIG. 9.
Figure 11:
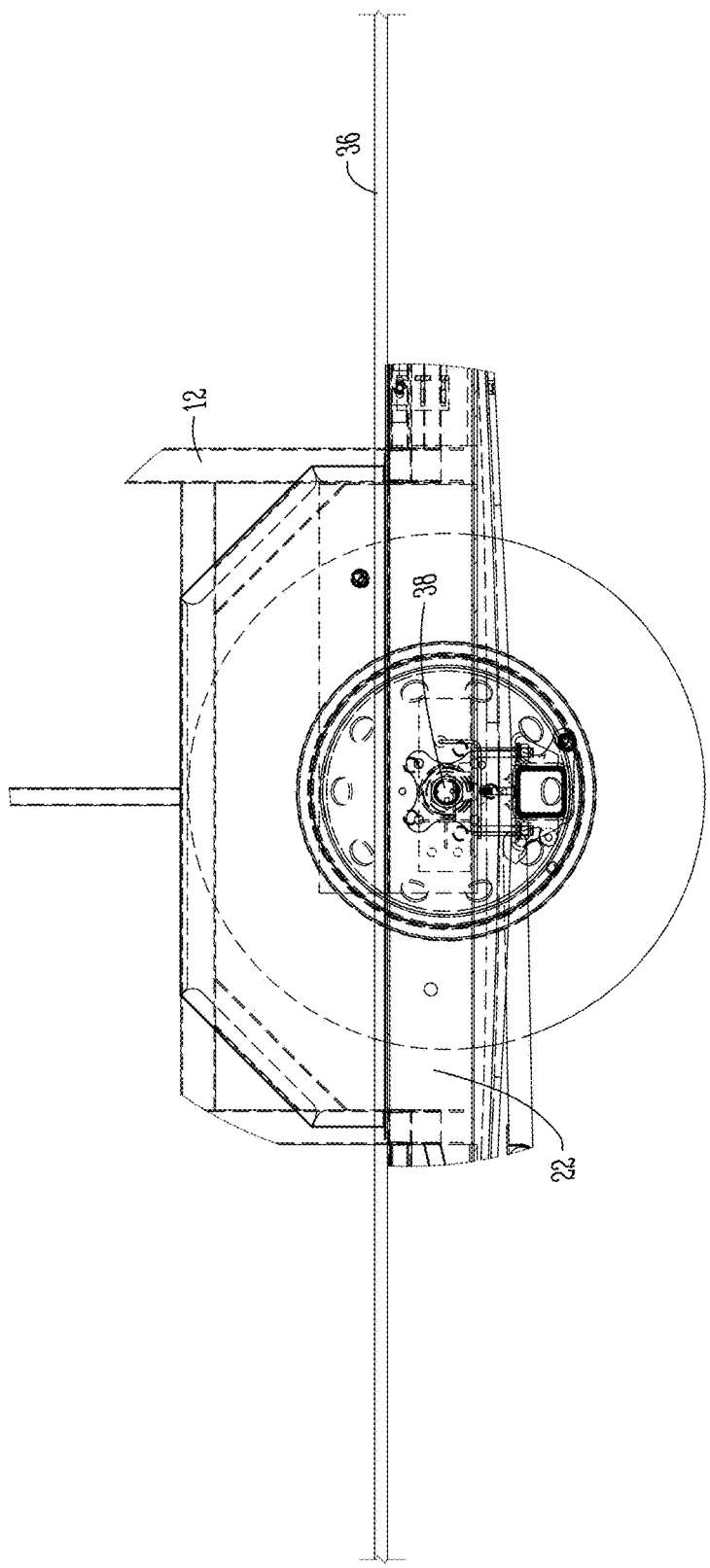
FIG. 11 is an enlarged view taken along lines 11-11 of FIG. 10.
Figure 12:
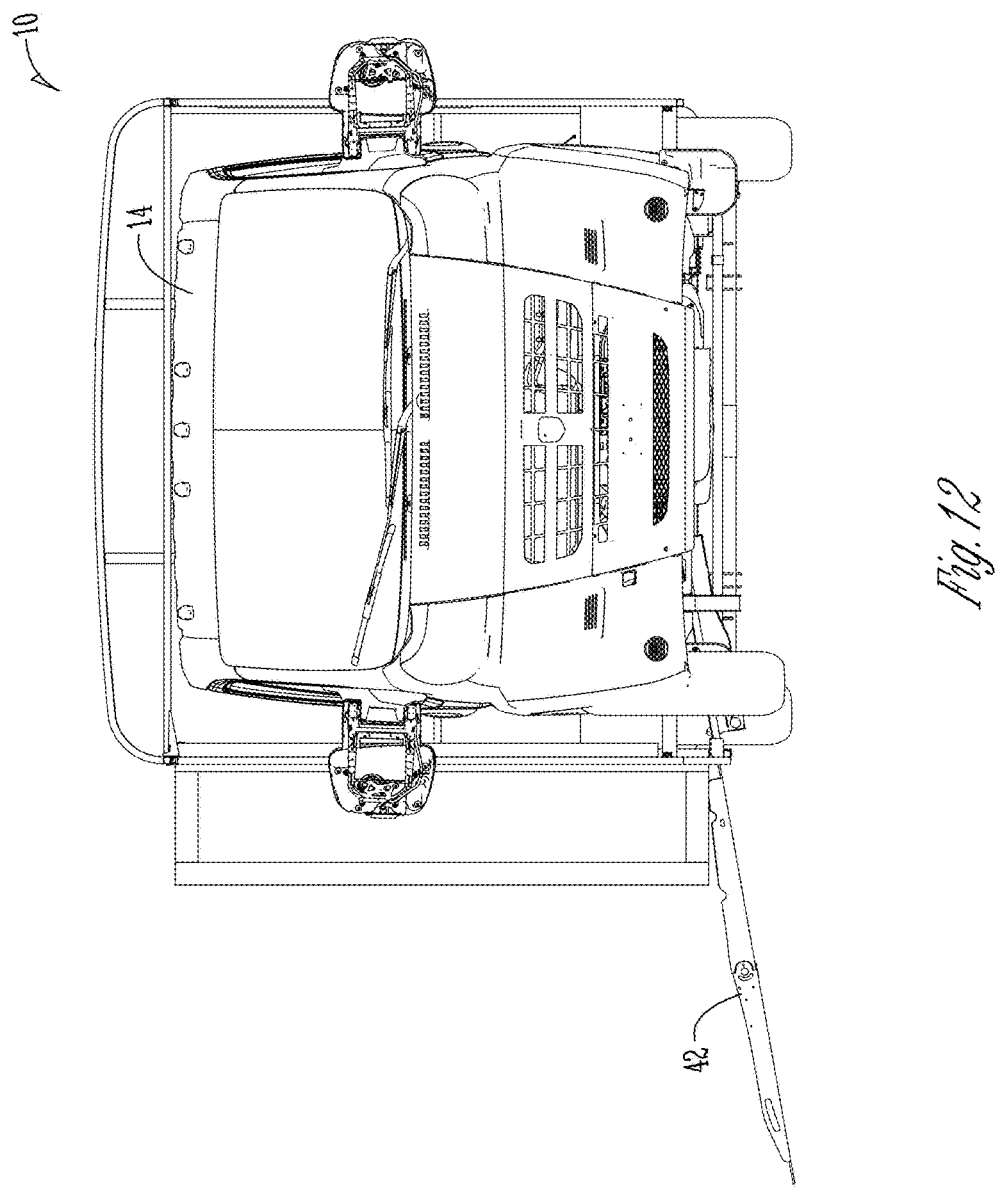
FIG. 12 is a front elevation view of the shuttle/transit bus of the present invention.
Figure 13:
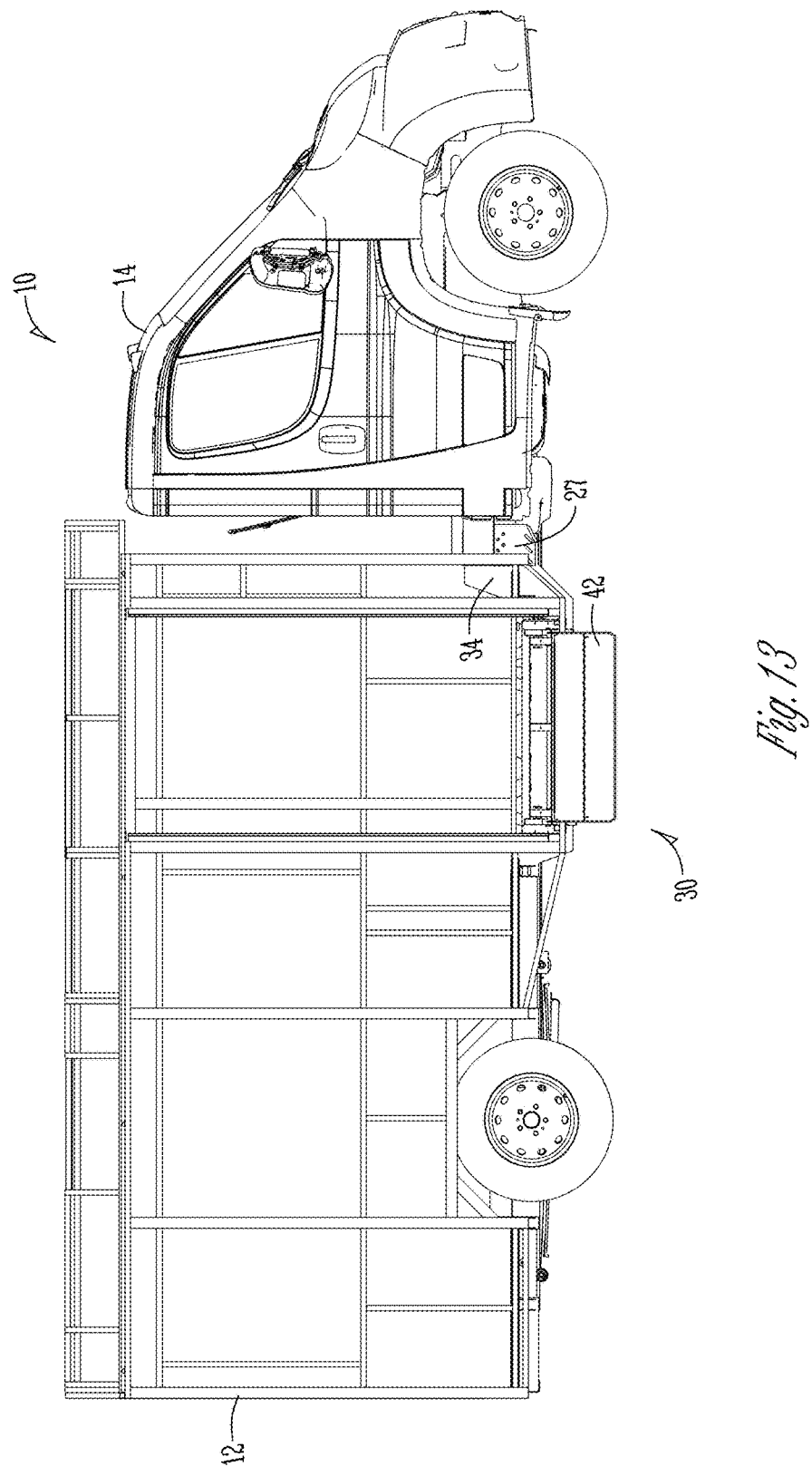
FIG. 13 is a side elevation view of the shuttle/transit bus of the present invention.

More particularly, the cab frame 18 includes hollow, longitudinally extending rails 20. The floor frame 16 includes longitudinal rails 22 which align in a co-linear orientation with the cab rails 20. The forward end of the left rail 22 has a plug connector 24 with a first male end 26 which plugs into the cutoff end of the cab rail 20, as best seen in FIG. 8. This connecting plug 26 is on the left side of the bus 10, behind the driver compartment of the cab 14. Plates 27 are positioned on opposite sides of the plug end 26, with bolts (not shown) extend through the plates 27, the cab frame 20 and the plug end 26, so as to add strength and integrity to the cab and body connection.

Figure 5:
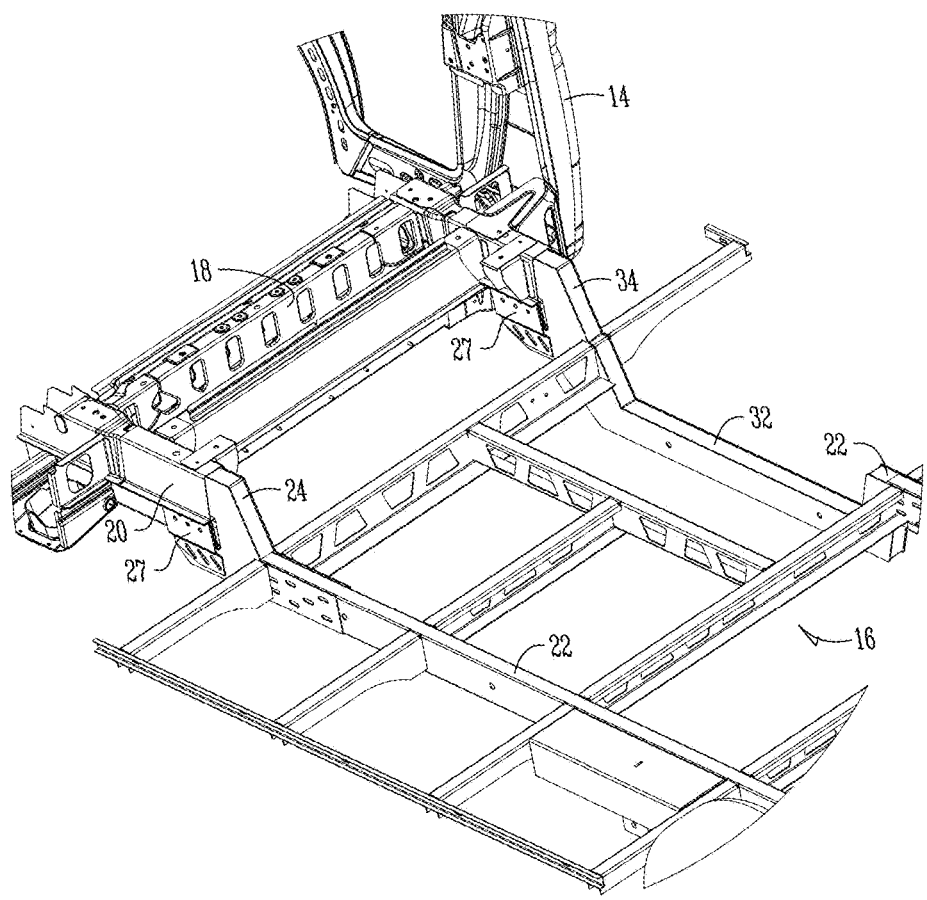
FIG. 5 is an enlarged view of the connection between the bus frame and the cab frame.
Figure 6:
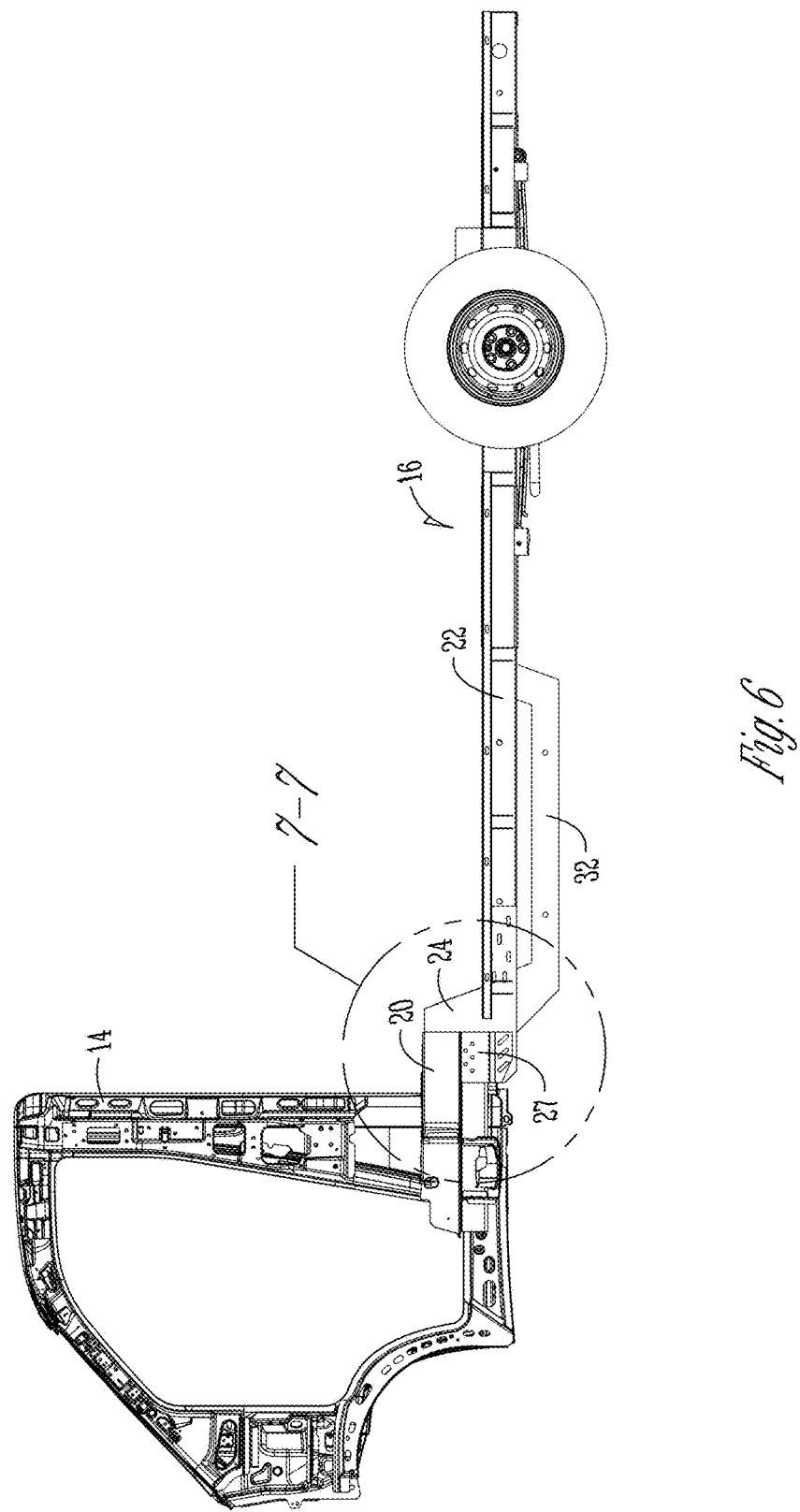
FIG. 6 is a side elevation view showing the connection between the bus floor frame and the cab frame.
Figure 7:
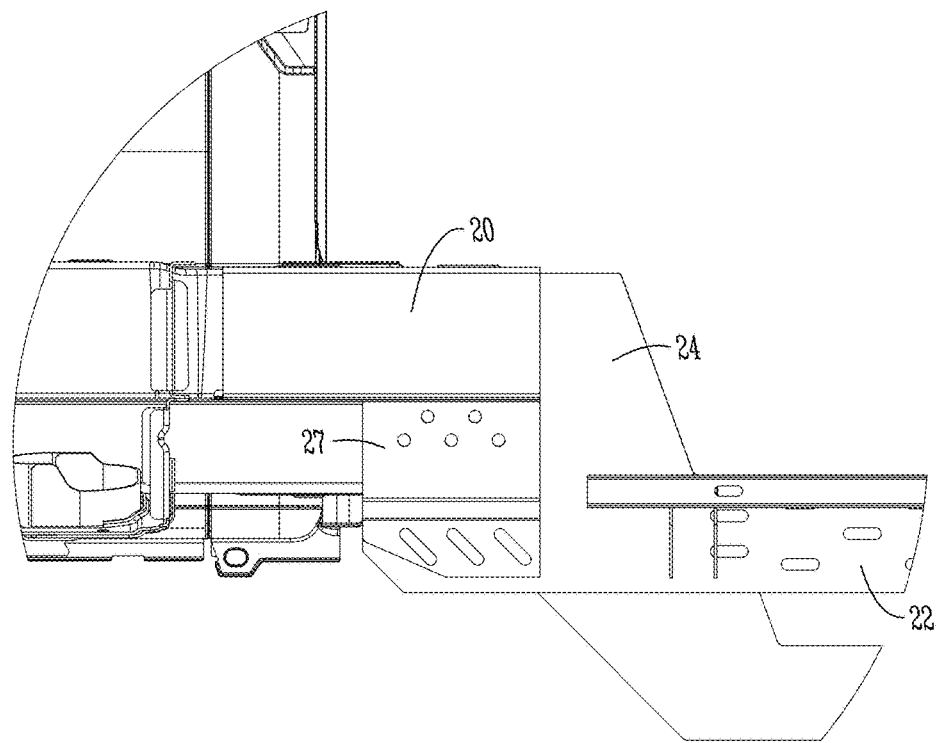
FIG. 7 is an enlarged view taken along line 7-7 in FIG. 6.

On the right side of the bus, there is an entryway 30 for passengers which is on the curb side of the street. The right floor rail 22 terminates just behind the entryway 30, as seen in FIG. 5. A drop down frame 32 extends between the right floor rail 22 and the right cab rail 20, with a plug connector 34 inserting into the cab rail 20, similar to the left side of the bus 10. The plug connector 34 is similar to the connector 24, except having a greater height. Bolted plates 27 are also used on the cab and body rail coupling on the right side of the bus.

Floor panels 36 are secured to the floor frame 16 so as to provide a continuous floor from the front of the body 12 to the rear of the body 12. The floor 36 is substantially horizontal with less than 2° slope front to back. The floor 36 does not include any step up feature over the rear axle 38, but rather resides in close proximity to the axle 38. The floor frame 16 and the attached floor 36 reside at an elevation below the cab frame 18.

The entryway 30 also has a floor panel 40 which is sloped at an angle of no more than 14°, so as to be in compliance with federal regulations. A ramp 42 can be extended from and retracted into the entryway 30, in any known manner. The deployed ramp 42 will engage the roadway or the sidewalk to allow ingress and egress for passengers, even in wheelchairs. The ramp 42 is retracted at all times when the bus is moving.

Unlike big mass transit cutaway buses, the floor 36 of the bus 10 is flat, continuous, and substantially horizontal from the front of the passenger compartment to the rear of the passenger compartment. Thus, for the full length of the body 12, the floor 36 does not change elevation so as to provide a safer surface for transport of all people, including those with handicaps and those confined to a wheelchair. The floor 36 is also at a lower elevation than conventional shuttle and transit buses, thereby simplifying ingress and egress for passengers.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A cutaway bus built on an OEM cab having a cab frame, comprising:
   a monocoque body structure defining a passenger compartment connected to the cab, and including a rear wall and a floor frame stepped down from the cab and extending continuously to the rear wall of the bus;
   a rear axle with wheels to support the body structure;
   a floor on top of the floor frame and extending substantially horizontally from the cab to a rear of the bus;
   a passenger doorway immediately behind the cab on one side of the body structure; and
   a ramp adjacent the doorway and extending downwardly toward one side of the bus;
   wherein the floor frame has male ends which plug into female ends on the cab frame.

2. The bus of claim 1 wherein the floor slopes less than 2° front to back.

3. The bus of claim 1 wherein the floor frame is bolted to the cab frame.

4. The bus of claim 1 wherein the floor extends rearward beyond the rear axle without stepping up over the rear axle.

5. The bus of claim 1 wherein the cab includes a floor, and the floor of the passenger compartment is at a lower elevation than the floor of the cab.

6. The bus of claim 1 having a wheel base between and including 135-200 inches.

7. The bus of claim 1 with the ramp is extendable and retractable.

8. In combination with an OEM cab having a frame and a floor, but no chassis, and a driver's position within the cab, a bus body with front and back ends, and opposite sides, the combination comprising:
   a floor frame front extending from the front end to the back end of the bus body and being mounted at the front end to the cab frame;
   the floor frame and cab frame being joined together by a male and female connection; and
   the floor frame being substantially horizontal and flat between the front and back ends.

9. The combination of claim 8 wherein the floor frame resides at an elevation lower than the cab frame.

10. The combination of claim 8 wherein the floor frame slopes at no greater than 2° from the front end to the back end.

11. A method of building a handicap accessible transit bus comprising:
   cutting an OEM cab and chassis assembly to separate the chassis from the cab;
   mounting a monocoque bus body to the cab, with the bus body having forward and rearward ends, and such that a floor of the bus body is lower than a floor of the cab and the floor of the bus body resides in a single plane extending from the forward end to the rearward end of the bus body with the plane having less than 2° slope front to back; and
   plugging a male connection on a floor frame of the bus body into a female connection on a cab frame of the cab;
   wherein the floor frame is substantially horizontal and flat between the forward and rearward ends.

12. The method of claim 11 further comprising attaching an extendable and retractable ramp to the bus body.

* * * * *